US011029871B2

(12) United States Patent
Krasner et al.

(10) Patent No.: US 11,029,871 B2
(45) Date of Patent: Jun. 8, 2021

(54) DEDUPLICATION USING NEAREST NEIGHBOR CLUSTER

(71) Applicant: EMC IP Holding Company LLC, Hopkinton, MA (US)

(72) Inventors: Jonathan Krasner, Coventry, RI (US); Sweetesh Singh, Benares (IN); Steven Chalmer, Redwood City, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/412,946

(22) Filed: May 15, 2019

(65) Prior Publication Data

US 2020/0363972 A1    Nov. 19, 2020

(51) Int. Cl.
  *G06F 3/06* (2006.01)
  *G06N 20/00* (2019.01)
  *H04L 9/06* (2006.01)

(52) U.S. Cl.
  CPC .......... *G06F 3/0641* (2013.01); *G06F 3/0608* (2013.01); *G06F 3/0659* (2013.01); *G06F 3/0673* (2013.01); *G06N 20/00* (2019.01); *H04L 9/0643* (2013.01)

(58) Field of Classification Search
  CPC .................................................. G06F 3/0641
  See application file for complete search history.

(56) References Cited

U.S. PATENT DOCUMENTS

| | | | | |
|---|---|---|---|---|
| 2004/0117403 | A1* | 6/2004 | Horn | G06F 16/284 |
| 2011/0225130 | A1* | 9/2011 | Tokoro | G06F 16/221 |
| | | | | 707/692 |
| 2016/0019232 | A1* | 1/2016 | Lambright | G06F 16/1752 |
| | | | | 707/692 |
| 2016/0139930 | A1* | 5/2016 | Evans | G06F 9/30196 |
| | | | | 712/208 |
| 2016/0314141 | A1* | 10/2016 | Harnik | G06F 16/1744 |
| 2017/0344579 | A1* | 11/2017 | Basireddy | G06F 16/1748 |
| 2020/0104359 | A1* | 4/2020 | Patel | G06F 16/313 |
| 2020/0265045 | A1* | 8/2020 | Tepper | G06N 20/00 |

* cited by examiner

*Primary Examiner* — Edward J Dudek, Jr.
(74) *Attorney, Agent, or Firm* — Krishnendu Gupta; Anne-Marie Dinius

(57) ABSTRACT

Disclosed are techniques for data deduplication, which include methods, systems, or computer products for reducing data redundancy in a data storage system comprising searching a cluster of nearest neighbors, wherein the cluster has been created using a locality sensitive hashing algorithm, to determine if a data block has been stored in the data storage system prior to writing the data block. In alternate embodiments, the nearest neighbor clusters could be created using one or more of the following algorithms: k-means clustering algorithm, a k-medoids clustering algorithm, a mean shift algorithm, a generalized method of moment (GMM) algorithm, or a density based spatial clustering of applications with noise (DBSCAN) algorithm.

18 Claims, 6 Drawing Sheets

DEDUPLICATION USING NEAREST NEIGHBOR CLUSTER

RELATED APPLICATIONS

This application is related to co-pending U.S. patent application Ser. No. 16/412,970 entitled DATA COMPRESSION USING NEAREST NEIGHBOR CLUSTER filed concurrently herewith, and incorporated herein by reference for all purposes.

BACKGROUND

Technical Field

This application generally relates to data storage and more particularly to techniques used in connection with data deduplication.

Description of Related Art

Most current data storage systems employ techniques for reducing the amount of redundant data stored there. These efforts include data deduplication and data compression. Typical data storage systems perform data deduplication first, followed by data compression. Data deduplication and data compression can be performed in real-time, in batched fashion, and for redundant data storage system& synchronously or asynchronously. Irrespective of the timing of data redundancy techniques, some common goals of these techniques are: accurately identifying duplicate or compressible data, minimizing any performance impact felt by the data storage system, improving the speed with which redundancy is determined, reducing complexity, minimizing the storage footprint for tracking deduplicated or compressed data and the like.

SUMMARY OF THE INVENTION

Disclosed are techniques for data deduplication, which include methods, systems, or computer products for reducing data redundancy in a data storage system comprising searching a cluster of nearest neighbors, wherein the cluster has been created using a locality sensitive hashing algorithm, to determine if a data block has been stored in the data storage system prior to writing the data block. In alternate embodiments, the nearest neighbor clusters could be created using one or more of the following algorithms: k-means clustering algorithm, a k-medoids clustering algorithm, a mean shift algorithm, a generalized method of moment (GMM) algorithm, or a density based spatial clustering of applications with noise (DBSCAN) algorithm.

BRIEF DESCRIPTION OF THE DRAWINGS

Features and advantages of the present invention will become more apparent from the following detailed description of exemplary embodiments thereof taken in conjunction with the accompanying drawings in which:

FIG. 2A is an example of an embodiment of a data storage system;

FIG. 2B is a representation of the logical internal communications between the directors and memory included in at least one embodiment of the data storage system, of FIG. 2A;

DETAILED DESCRIPTION OF EMBODIMENT(S)

Figure 1:
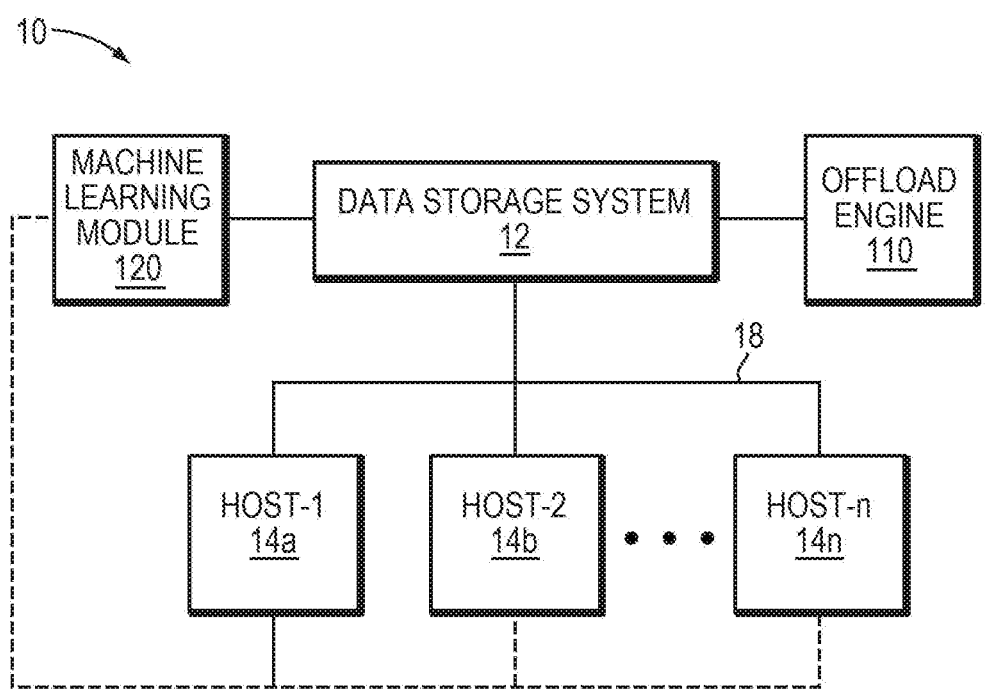
FIGS. 1, 2A, 2B are example architectural diagrams of components of various systems in at least one embodiment in accordance with techniques herein disclosed.

Deduplication is a technique for reducing the physical media needed to store data. Data deduplication techniques eliminate redundant or duplicate copies of the same data by keeping a single copy of the data or content and providing a reference count, pointer, digest, token, signature or other reference identifying the single copy of the data or content. The pointer or reference may be used to describe multiple instances of a same copy of data such as may be present, for example, when backing up a same set of data at different points in time, when storing identical copies of the same document, and the like. Deduplication's effectiveness in reducing the amount of physical storage requirements relies on the fact that, for example, business applications tend to store data in formats that include identical subsets or portions of data. For example, email servers may hold many identical copies of the same documents. Additionally, the advent of remote desktop environments means that entire operating system images may be stored in duplicate, with only the state data being different for each user's environment.

Deduplication can be done on the file level, or on a block-level basis. Deduplication can also be performed at the source or target level. In post-process deduplication, identical data portions are determined after the data is stored to disk. In in-line deduplication, identical data-portions are determined before the data, including the identical portion, is moved from memory to storage on disk.

To determine identical data portions, digital fingerprints (hereinafter "fingerprints") of data portions can be generated and compared to previously generated fingerprints. A fingerprint can serve as an identifier of data having a fixed size that is less than the size of the data itself, desirably much less in size. A fingerprint may be generated by applying a hash function to data, for example, Message Digest 5 (MD5), Secure Hash Algorithm 1 (SHA-1), SHA-2 or SHA-256, SHA-384, etc., to produce a hash value or digest of the data.

Fingerprints may be stored in an entry of a hash table, for example, in volatile memory of the data storage system, along with an indication of the location at which the actual data is stored within the data storage system, e.g., on disk. Each new hash value generated for an I/O (e.g., write) operation may be compared to hash table entries to determine whether there is a match, in which case, rather than storing the data from which the hash value was generated to disk, a reference (e.g., pointer) to the hash entry in the hash table or the physical storage location of the data portion represented by the hash entry may be maintained, for example, in a physical address reference table.

A hash table in which linked-lists are employed may be configured to have a predefined number of entries less than the number of potential unique fingerprint values for a given storage system. A mathematical function (e.g., a Murmur function) may be used to translate every hash value into a value (e.g., an integer) corresponding to an entry of the table, where the mathematical function may translate/map multiple hash values to a same hash table entry value. For entries to which multiple hashes map/translate, a linked list of fingerprints may be maintained, where each linked item in the linked list specifies a fingerprint, a physical storage location (or an indirect reference thereto) of the data portion corresponding to the fingerprint and a link to a next linked item in the linked list, if any.

In one example, to perform deduplication on a current data portion, a fingerprint can be generated for the data portion, and then a mathematical function can be applied to the fingerprint to map it to a hash table entry. If there are any other fingerprints already stored for the entry (e.g., one, or a linked list), then the generated fingerprint can be compared to each fingerprint at the entry. If there is a match, a reference to the physical storage location of the data portion corresponding to the matched entry is recorded in the physical table address entry for the current data portion. If no fingerprint of the hash table entry matches, a new link item can be added to the linked list for the generated fingerprint of the current data portion. If there are no other fingerprints already stored for the entry, then the fingerprint generated for the current data portion can become the first item stored in the entry.

It can be appreciated that there can be a small probability that two different data sets can produce an identical hash digest creating a false positive, called a "hash collision." A hash collision can lead to data loss, unauthorized data access, or other security concerns. In some implementations, this probability can be reduced by using multiple hashes or by performing a bit-by-bit comparison of data files, data blocks, and the like.

A deduplication process can include assigning hash values to subsections or portions of data using a hashing function that minimizes the possibility of hash value collisions. Deduplication techniques may use any suitable hashing algorithm, or technique to generate a hash value for a data portion, where the hash value may be used as the reference for the data portion. For example, existing deduplication techniques may use a well-known hashing algorithm such as, for example, MD5, SHA-1, SHA-256. SHA-384 and the like.

It can be appreciated that generating hashes using some hashing algorithms consume more computational resources than others. The less computationally intensive hashing algorithms are sometimes considered "weaker" hash algorithms. For example, MD5 and SHA-1 can be considered "weaker" hashing algorithms when compared, for example, with SHA-256 and SHA-384 hash algorithms. The inherent tradeoff between "weaker" hashing algorithms and "stronger" hashing algorithms lies in the computational resources, needed to calculate and compare the hash values as compared with the accuracy of the resulting comparisons made during a deduplication or compression process. Accordingly, choosing a hashing value suited to the accuracy needs of the system administrator and the data being stored is an inherent consideration within the realm of data protection.

In some implementations, choosing a suitable hashing algorithm may be based on determining the least computationally intensive hashing algorithm that still provides an acceptably low probability of hash value collisions. It can be appreciated that, by minimizing or eliminating hash value collisions, two data portions that having matching hash values may be determined to be duplicates. If a first data portion has a first corresponding hash value, a second data portion has a second corresponding hash value, and the first and second corresponding hash values do not match, it may be determined that the first and second data portions are unique data portions.

In some implementations, deduplication solutions can use cryptographic hash functions to detect redundant data. When multiple data sets have the same message digest produced by a hash function, only one version of the data is kept. A reference counter or pointer is kept for other owners of the duplicative dataset. One challenge inherent in this technique emerges by virtue of the fact that datasets having just a single bit difference produce entirely different, unrelated, scattered hash digests. For example, two identical files may be deemed non-redundant if they have one non-content specific difference, e.g., different encoding, differing extension format, or different compression information.

Figure 3:
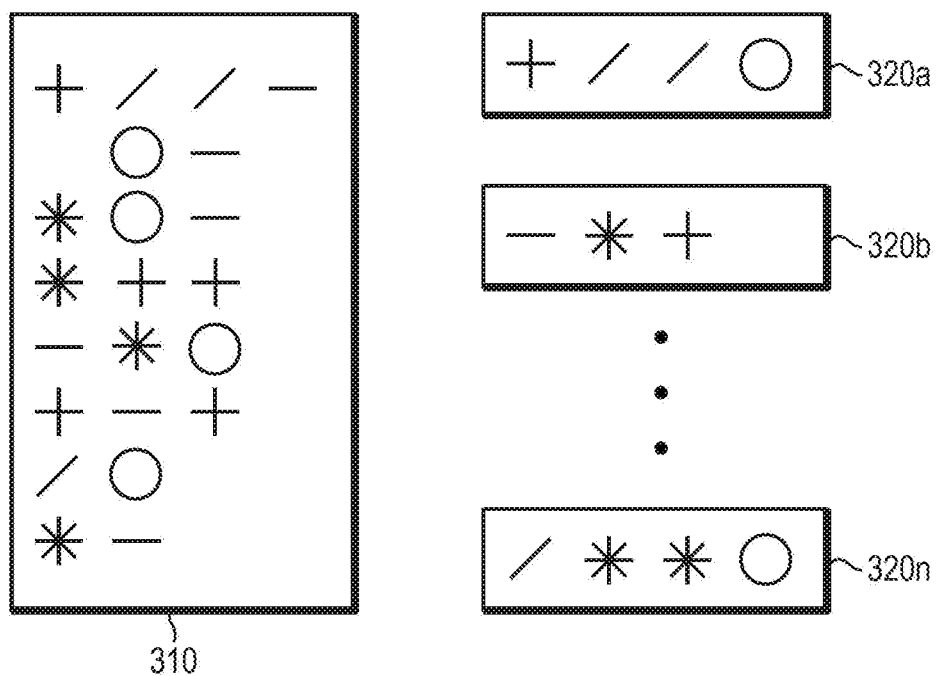
FIG. 3 is an example block diagram illustrating a cryptographic hashing techniques-.

It can be appreciated that in using some hashing techniques, digest values can be distributed as smoothly as possible over an entire range of possible values. For example, FIG. 3 depicts a high-level representation of this type of distribution.

In this example, the cryptographic family of hash values 310 are organized randomly with buckets 320*a*-320*n*. Buckets 320*a*-320*n* are spaces within a hash table where actual values or a pointer to the actual value, also called message digest, will be placed. Buckets can also be referred to in the art as hash indices or hash slots. This results in data sets having as little as a single bit difference having widely disparate digest values.

Digests, also called "fingerprints" or "signatures," are created by applying hashing algorithms such as MD5, SHA-1, SHA-2 SHA-256, and SHA-384 (generally referred to singularly or collectively as "cryptographic hashing functions") on a message of any length.

When we apply cryptographic hash functions on two similar messages (even if these two messages differ in only one bit), the hash value (also called digest, fingerprint, signature) will be completely unrelated, giving no hint of "proximity, closeness or similarity" of the original messages. As a result, currently used cryptographic hash functions cannot be used for identifying nearest neighbors and hence are not helpful in forming clusters.

Embodiments herein overcome these shortcomings because locality sensitive hashing, k-means clustering algorithms, a k-medoids clustering algorithms, a mean shift algorithm, a generalized method of moment (GMM) algorithm, or a density based spatial clustering of applications with noise (DB SCAN) algorithm maintains the similarity of the original messages in the similarity of the digests created from those messages. Similar messages are clustered together based on the similarity of their digest/fingerprint/signature/hash value.

Clustering is an unsupervised learning technique that brings together similar storage units so that units which are closer to each other in some space, are in the same cluster compared to units in different clusters. Clustering of the data can be considered as a preprocessing step to identify entropy/randomness in a system. Once clustering has been applied, deduplication or compression can be applied within different clusters to maximize space saving. Intracultural deduplication or compression reduces the search space, which ultimately results in faster completion times for deduplication and compression.

Cluster identification enables faster deduplication pointer updates in the case of host writes. Additionally, different datasets in a cluster can, have similar entropy and structure, which results in more repeating pattern identification with smaller code replacements, thus improving compression. In data storage systems, there is often a desire to improve deduplication or compression functionality. Embodiments herein are directed toward utilizing nearest neighbor clustering to improve one or both of these functions. Embodiments herein are directed to creating a nearest neighbor cluster that can be used in one or both of deduplication or data compression.

In embodiments, unsupervised learning techniques are used to form nearest neighbor clusters. In some aspects, these nearest neighbor clusters can be used to improve deduplication, data compression, and the like.

Clustering of the stored data in a reasonable way becomes beneficial to many storage algorithms related to space reduction, tiering or replication.

The number of clusters becomes an indirect way of evaluating entropy in an array. The number of clusters, in turn, can be used to recommend a compression algorithm for space reduction, as well as a time for compression or decompression. Additionally, the number of clusters can inform a deduplication strategy by using a reduced search, space.

In embodiments, approaches followed can be locality sensitive hashing with hamming distance metric, or one or more of the following algorithms" k-means, k-medoids, mean shift, generalized method of moment (GMM), or density based spatial clustering of applications with noise (DBSCAN) considering various statistical attributes of the data.

Embodiments take advantage of the fact that a bigger data segment is a point in a multidimensional plane considering hashes/digests of data segments as coordinates of data segments in consideration. Hashing algorithms can be distance sensitive, or other weaker hashes. Cryptographic hashes can also be explored because one big data segment decomposed into multiple smaller ones increases the probability of them maintaining a close distance metric if they are similar.

In embodiments, we break a large data segment into multiple smaller ones. Now application of a hashing algorithm on these multiple smaller segments will yield a number, which we consider as a coordinate in a multiple dimension coordinate system. For example, suppose a data segment is 2048 blocks, which in alternate embodiments can be any storage unit, e.g., byte, block, etc. The 2048 block exemplary data segment could be broken into four 512 block sized segments. Now we have multiple options of hashing algorithms we could apply on these smaller segments and find a number (a/k/a digest, fingerprints, hash value) which will be considered as a coordinate in 4-dimensional system. Some exemplary hashing algorithms, without limitation are: distance sensitive hashes (a generalization of Locality Sensitive Hashing), cryptographic hashes (considered to be strong in terms of collision resistant, computational power required, breakability), and weak hashes (require less computation, relatively higher probability of collision) are available alternatives.

For a very rough example, consider two 2048 block data segments [A B C D] and [A P C D]. A B C D P are each a single 512 block segment. Now we apply any of the hash functions, cryptographic, distance sensitive, weak etc on these small segments.

$$\text{Hash}(A) = \text{val1} \quad \text{Hash}(B) = \text{val2} \quad \text{Hash}(C) = \text{val3}$$
$$\text{Hash}(D) = \text{val4}$$

Hence the original first segment becomes a point in a 4-dimensional system, that point has coordinate (val1, val2, val3, val4).

Please observe, by similar logic, the second data segment [APCD] becomes a point (val1, val5, val3, val4).

Since the original data segments were similar in content, their corresponding coordinates are also closer in this multidimensional system (e.g., they have 3 of the same coordinates, val1, val3 and val4). Any clustering algorithm chosen in embodiments will put them together in the same cluster because the clustering algorithm, would see closely valued coordinates.

In embodiments, we endeavor to parse larger data blocks into multiple small segments taking into consideration a point in a multidimensional plane. This allows the clustering algorithms to place data blocks having similar content in the same cluster.

In alternate embodiments, using statistical attributes of the data as coordinates in a hyperplane and applying k-means to detect the data clusters can be used to create a cluster of nearest neighbors. There can be many statistical features of the dataset, for example and without limitation, size, entropy, chi square test, and Pearson correlation coefficient for applying unsupervised learning. Multiple (in thousands) random storage units (such as files) were generated for each file. These files were compressed with different compression algorithms individually, as a whole (considering all of them as one unit) and compression was applied on different clusters of the files, grouped by feature space explained by the above statistical attribute.

Embodiments enabled clustering of storage units according to entropy, size, chi square value, correlation coefficients. Compressing individual clusters results in highest space saving. Clustering in such space allowed compression algorithm embodiments to find more patterns, adjust smaller references and smaller coding. In one aspect, the nearest neighbor clusters can contain a plurality of master data blocks, that is data blocks having a high frequency of recurrence.

In addition, performing deduplication for a data portion can be computationally intensive, involving at least: generating a fingerprint, applying a mathematical function to map the fingerprint to a hash table entry, potentially traversing multiple linked items for a single hash table entry, and comparing fingerprint values to fingerprint values of each item (if any) of a linked list of a hash table entry. The strength of the hashing algorithm used is proportionally related to computational intensity. Moreover, the computation resources consumed can depend on the number of fingerprints stored in the hash table; e.g., the number of linked items in each linked list, of a hash table entry. Further, significant amounts of memory may need to be reserved and/or used to implement a hash table with linked lists, and much of this reserved memory may not be used, which is an inefficient use of memory resources.

Embodiments described herein provide for using Nearest Neighbor and Approximate Nearest Neighbor searching techniques in order to enhance efficiency by providing the same level of accuracy with less computational cycles during the deduplication process.

In at least one embodiment, the hash function used may be any suitable cryptographic hash function. Examples of some cryptographic hash functions are mentioned herein. Input data provided as the input to the hash function may be referred to as the input data, data block, data portion, or message. The function or algorithm output may be referred to as the hash, hash value, message digest or simply the digest. It can be appreciated that an input data set may be partitioned into data portions where each data portion can be an input to the hash function for which a hash value is determined.

Deduplication can include additional processing performed after calculating the hash values for data portions. For example, the additional processing can include determining whether or not a new data portion is a duplicate of an existing data portion already stored in a database or other data container (e.g., whether a new data portion is a duplicate of an existing data portion already stored, or whether the new data portion is not, a duplicate of an existing data portion already stored). In another example, a data structure can be searched for stored hash values, such as by look-up in an ordered table of stored hash values, to see if the newly calculated hash values for a new set of data portions already exist.

The table of entries may be indexed or accessed by a hash value, e.g., a hash value for a data portion may map to an entry of the table where it is desirable that hash collisions are eliminated or otherwise minimized. Each entry of the table may be null or empty, or otherwise non-null/not empty. An entry indexed by a particular hash value can be marked as null/empty if a data portion having the particular hash value does not already exist in the database. An entry indexed by a particular hash value can be marked as otherwise non-null/non-empty and map to (e.g., identifies) an existing data portion currently stored in the database if a data portion having already exists in the database.

It can be appreciated that if a newly calculated hash value for a new data portion matches an existing entry in the table, the new data portion is a duplicate of an existing data portion. If a newly calculated hash value for a new data portion does not match an existing entry in the table (e.g. no existing, non-empty/non-null entry in the table for the newly calculated hash value), the new data portion can be determined not to be a duplicate of an existing data portion.

If the new data portion has been determined to be a duplicate, the new data portion is not added to the database and no new entry is added to the table. If the data portion is determined to be non-duplicative, the new data portion along with the newly calculated hash value could be stored in the data storage system. In this instance, a new entry in the hash table could be added corresponding to the non-duplicative data portion.

Figure 4:
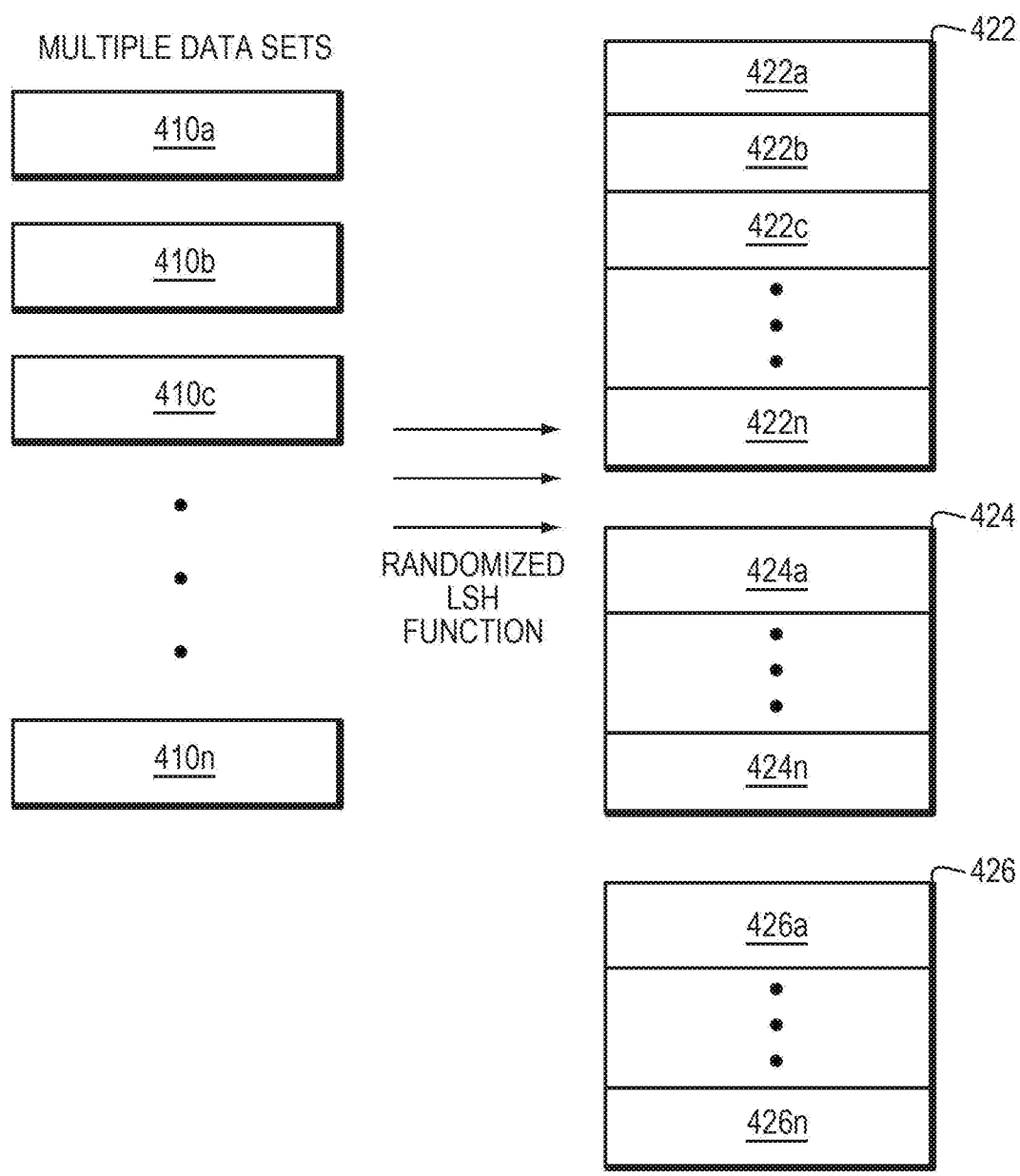
FIG. 4 is an example block diagram illustrating illustrates example embodiments in accordance with techniques herein.

FIG. 4 depicts multiple datasets 410 being separated into nearest neighbor and approximate nearest neighbor clusters 422, 424, 426. In some embodiments, locality sensitive hashing can be used to convert the high dimensional feature space of multiple data sets 410 into a lower dimensional feature space while still retaining a random permutation of relevant features that can provide estimates to a pairwise distance or similarity.

In some embodiments, a lower dimensional feature space could be created using a machine learning module 120. Machine learning module 120 can be coupled to data storage system 12 or one or more hosts 14.

In some embodiments, nearest neighbor clusters 422, 424, 426 could be generated using locality sensitive hashing with hamming distance as at least one determinative factor in deciding what is a "nearest" or "approximate nearest" neighbor. In some embodiments, one or more of 422, 424, 426 can be a nearest neighbor cluster or an approximate nearest neighbor cluster. In some embodiments, locality sensitive hashing using Euclidian distance, Manhattan distance, and the like can be used to determine nearest neighbor or approximate nearest neighbor clusters. For example, nearest neighbor clusters 422, 424, 426 can contain data sets having a high degree of similarity.

In order to generate nearest neighbor clusters, a locality sensitive hashing algorithm can be applied to dataset 410. In some embodiments, hashing can be performed periodically as determined by a system administrator or a machine learning module. In some embodiments, hashing can be performed prior to committing write data. Irrespective of timing, data blocks 410a, 410b, 410c . . . 410n can be hashed using a hashing algorithm such as SHA-1 or MD5. In embodiments, it is possible to choose hashing algorithms that consume less computational resources than the highest cryptographic hashing algorithms, thereby reducing the processing power required to perform deduplication.

Applying a locality sensitive hashing algorithm to data blocks 410a, 410b, 410c . . . 410n can, result in the creation of clusters 422, 424, 426. Each of these clusters 422, 424, 426 can contain a hashed data block, e.g., 422a, 422b, 422c, 422n, 424a, 424n, 426a, 426n, corresponding to a data block from dataset 410. Embodiments strive to place hashed data blocks e.g., 422a, 422b, 422c, 422n, 424a, 424n, 426a, 426n, close to one another under a chosen metric or combination of metrics, e.g., hamming distance, Euclidean distance, Manhattan distance and the like. In this way, embodiments can create clusters 422, 424, 426 of nearest neighbors or approximate nearest neighbors, which can ultimately be used in performing deduplication.

In some embodiments, users can choose a metric for determining nearest neighbor or approximate nearest neighbor. In some embodiments, a machine learning module chooses a metric for nearest neighbor/approximate nearest neighbor determination. In this way, embodiments can facilitate flexibility when determining the maximum approximation error boundary, which can result in control over the tradeoffs between accuracy and runtime. Moreover, once nearest/approximate nearest neighbors have been identified and placed into clusters 422, 424, 426 computing a digest and comparing with the message digests of other neighbors can lead to enhanced compute efficiency and reduced deduplication runtime. The overall user experience in these embodiments can include faster write times. Overall system benefits of these embodiments are increased efficiency, speed, and processing power.

It can be appreciated that preserving the short and compact codes produced by employing locality sensitive hashing can exponentially reduce the search time required in high dimensional hamming spaces when finding similar or same items in a typical data storage environment.

Figure 5:
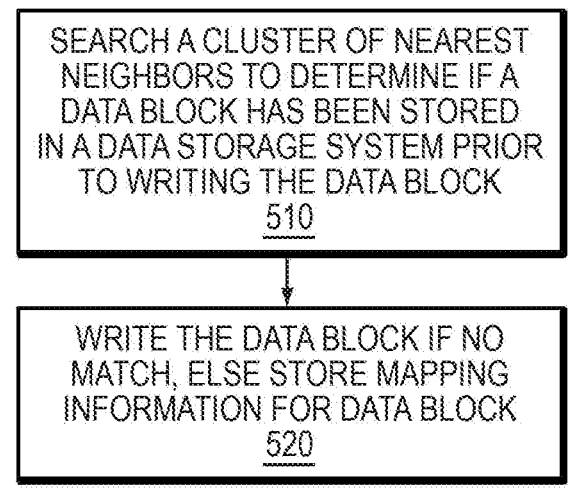
FIG. 5 is a flowchart of processing steps that may be performed in embodiments in accordance with techniques herein.

Irrespective of when nearest neighbor cluster 422, 424, 426 are formed, the deduplication process can be performed prior to committing data blocks to storage. Duplicate datasets can be identified by performing a locality sensitive hash on a data block prior to writing the data block to storage. FIG. 5 depicts steps associated with these embodiments. In embodiments, there is provided a method for reducing data redundancy in a data storage system. The method comprises searching 510 a cluster of nearest neighbors, wherein the cluster has been created using a locality sensitive hashing algorithm, in order to determine if a data block has been stored in the data storage system prior to writing the data block. In some embodiments, the nearest neighbor clusters can include one or more approximate nearest neighbor clusters.

If the search 510 reveals no match for the hashed value of the data block, it is written 520 to the data storage system. If the search 510 shows a match for the hashed value of the data block, mapping information is stored 520 for the data block so that the user owning the duplicate block can access the data at a later time.

In some embodiments, the nearest neighbor or approximate nearest neighbor clusters are created using machine learning module 120. In alternate embodiments, nearest neighbor or approximate nearest neighbor clusters are created using an offload engine 110. In some embodiments, offload engine is a graphics processing unit ("GPU"). In alternate embodiments, offload engine is central processing unit ("CPU"), an ASIC, a purpose-built processor, or other type of processor suited to work in parallel with the processing functions of data storage system 10. The use of offload engine 110 allows creation of or comparison with nearest neighbor clusters 422, 424, 426 in parallel to normal system operations for data storage system 10. These embodiments improve throughput and relieve large CPU cycles for IOs and other host 14 visible operations. In some embodiments utilizing offload engine 110, intelligent data partitions, communication hierarchy, or memory hierarchy can be implemented for forming hash tables or for employing the querying process.

Referring now to FIG. 1, shown is an example of an embodiment of a system that may be used in performing the techniques described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such, as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
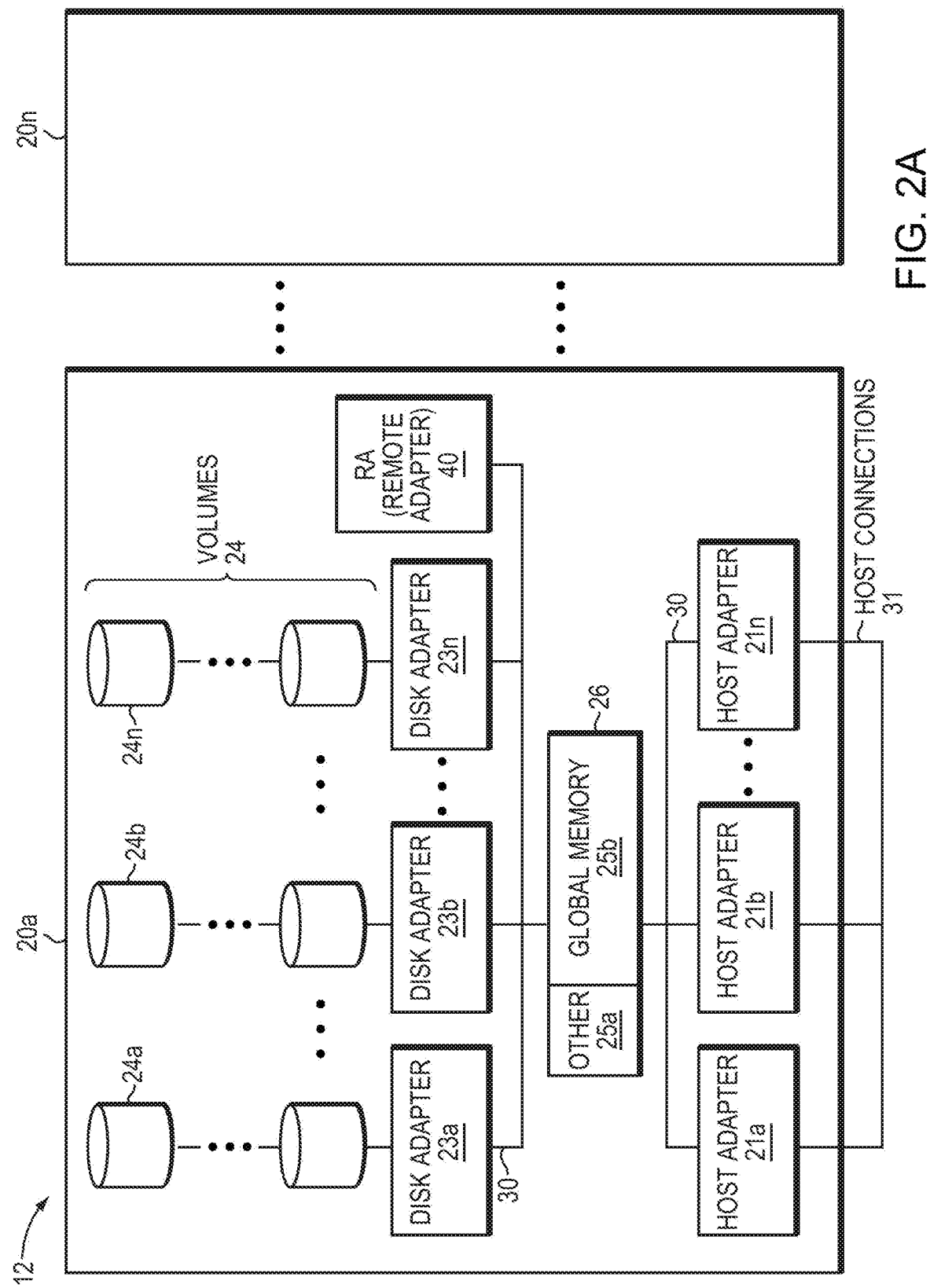

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment.

The type of communication connection used may vary with certain system parameters and requirements, such as those related to bandwidth and throughput required in accordance with a rate of I/O requests as may be issued by the host computer systems, for example, to the data storage system 12. In, this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices (e.g., physical non-volatile storage devices), such as disk devices or volumes, in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single Disk Adapter, such as 23a, may be responsible for the management of a row of disks or volumes, such as row 24a. The system 20a may also include one or more host adapters ("HAs") or directors 21a-21n. Each of these Host Adapters may be used to manage communications and data operations between one or more host systems and the global memory. In an embodiment, the Host Adapter may be a Fibre Channel Adapter or another adapter which facilitates host communication.

Also shown in the storage system 20a is an Remote Adapter ("RA") 40. The Remote Adapter may be hardware including a processor used to facilitate communication between data storage systems, such as between two of the same or different types of data storage systems.

One or more internal logical communication paths may exist between the Disk Adapter's, the Remote Adapter's, the Host Adapter's, and the memory 26. An embodiment, for example, may use one or more internal busses and/or communication modules. For example, the global memory portion 25b may be used to facilitate data transfers and other communications between the Disk Adapters, Host Adapters and Remote Adapters in a data storage system. In one embodiment, the Disk Adapters 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable storage device such as a rotating disk drive, flash-based storage, and the like. The particular data storage system as described in this embodiment, or a particular device thereof, such as a rotating disk or solid-state storage device (e.g., a flash-based storage device), should not be construed as a limitation. Other types of commercially available data storage systems, as well as processors and hardware controlling access to these particular devices, may also be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be de-staged from cache to the physical storage device, such as by a Disk Adapter.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices, logical volumes or logical units (LUNs). The LUNs may or may not correspond to the actual disk drives. For example, one or more LUNs may reside on a single physical disk drive. Data in a single storage system may be accessed by multiple hosts allowing the hosts to share the data residing therein. The Host Adapters may be used in connection with communications between a data storage system and a host system. The Remote Adapters may be used in facilitating communications between two data storage systems. The Disk Adapters may be used in connection with facilitating communications to the associated disk drive(s) and LUN(s) residing thereon.

Figure 2B:
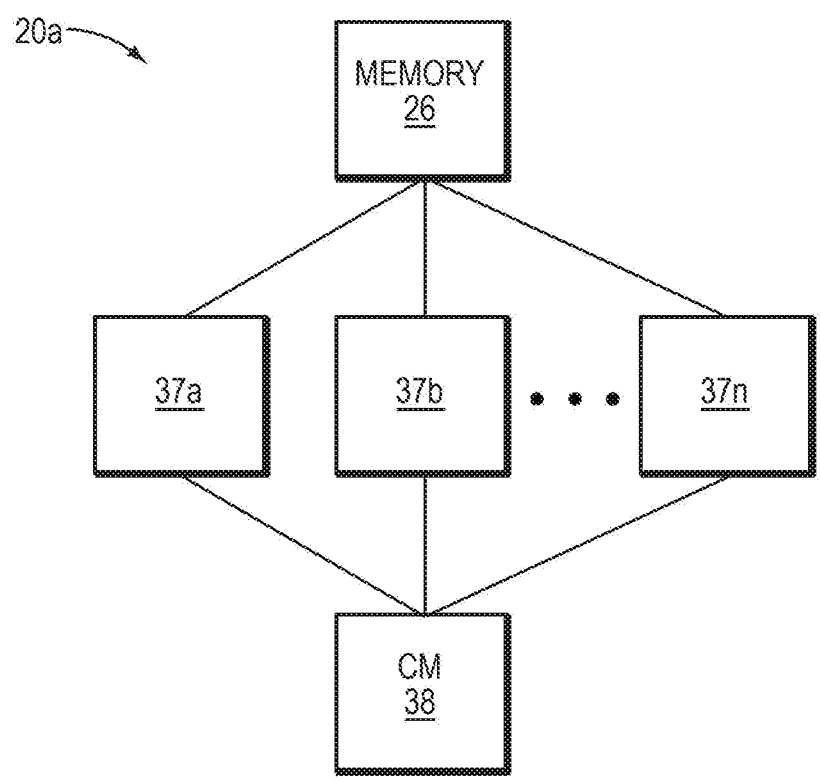

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the Host Adapter's, Remote Adapter's, or Disk Adapter's that may be included in a data storage system. In an embodiment disclosed herein, there may be up to sixteen directors coupled to the memory 26.

Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment of a data storage system in accordance with techniques herein, components such as Host Adapters, Disk Adapters, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each Host Adapter, DA, Host Adapter port and the like), techniques herein may be performed in a physical data storage system including one or more emulated or virtualized components (e.g., emulated or virtualized ports, emulated or virtualized DAs or Host Adapters), and also a virtualized or emulated data storage system including virtualized or emulated components.

In an embodiment in accordance with techniques herein, the data, storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

As mentioned above, an embodiment in accordance with techniques herein may execute at least some processing described in more detail elsewhere herein on a GPU rather than a CPU. Such partitioning of processing among the GPU and CPU offloads processing from the CPU to the GPU. In this, manner, additional CPU time may now be available to perform other processing of other tasks such as related to I/O processing. Performing the other tasks may including executing code, for example, that is not amenable to parallel processing as performed by the GPU (e.g., with a same instruction stream executing in parallel). A high-level programming difference between CPUs and GPUs is that GPUs are as used herein are optimized for data-parallel workloads, while CPUs cores are optimized for executing a single stream of instructions as quickly as possible.

A GPU may be characterized as a SIMD (single instruction stream-multiple data stream) device optimized for executing the same instruction stream in parallel. Generally, a single GPU includes multiple cores where all cores may execute the same instruction stream simultaneously/in parallel and where each of the different cores or instruction stream execution instances may operate on different data. Thus, for example, a GPU including 32 cores may perform parallel processing of the same code or instruction stream, where each of the 32 cores execute the same instruction stream on a different data set (e.g., different data inputs and outputs).

In one embodiment in accordance with techniques herein, processing may be partitioned between the CPU domain and the GPU domain. The CPU domain may include one or more CPUs and the GPU domain may include one or more GPUs or GPU devices. In such an embodiment, rather than perform all processing in the CPU domain, techniques described herein may partition processing between the GPU domain and the CPU domain. For example, as described in more detail elsewhere herein, processing may be performed in parallel on the GPU for simultaneous calculation of multiple data deduplication digests or hash values where each such digest or hash value may be computed using the same hashing algorithm. In at least one embodiment with a GPU having 32 cores or more generally capable of executing 32 simultaneous streams of the same instruction/code stream operating, respectively, on 32 different data streams or inputs, 32 digests or hash values may be computed in parallel on the GPU.

Processing as described herein as being performed by the GPU may also be performed by other hardware component(s) providing similar functionality to that of the GPU. An embodiment of the techniques herein may, for example, select to perform processing steps which are computationally intensive and amenable for parallelization using the GPU while performing other processing serially in the CPU.

Both the CPU and one or more GPUs may be included in the same system. Code that executes in the GPU may be programmed, for example, using the CUDA programming language designed to exploit parallel processing characteristics of the GPU. The GPU can handle thousands of concurrent programming threads, each running one element of a parallel computation. To facilitate parallel programming, CUDA organizes these threads in blocks, and the threads blocks are organized in a grid. The threads in a thread block can be indexed in one, two, or three dimensions, and the grid can be indexed in one or two dimensions.

In an embodiment described herein in following paragraphs, the function calls that run in the GPU are called "kernels," and are launched from the CPU. Each kernel corresponds to a portion of parallel code that may be executed by multiple threads, where such threads are organized into a number of blocks. A "grid" of blocks may be run, as a unit of computation on the GPU where all threads in the grid may execute concurrently and each such thread may operate on different data (e.g., each thread executing in parallel executes the same instruction stream but each thread may execute using different input data and generating different output data independent of the other concurrently executing threads of the same grid).

As described herein, the CPU may be included in a data storage system (e.g. as one of the one or more main CPU(s) of the data storage system), and the GPU may be located, for example, on a plug-in card of the system also referred to as the GPU device. Thus, the CPU and GPU may be included in the same system (such as the same data storage system) and may communicate, for example, using a bus such as a PCIe (Peripheral component interconnect express).

As known in the art, the GPU device may have different types of memory forming a memory hierarchy each with different size, speed, and usage. Typical data flow between the CPU and GPU may include the CPU copying data to the memory of the GPU. Instructions such as those included in the kernel may also be copied to the memory of the GPU. The GPU then asynchronously executes code of the kernel (e.g. multiple threads concurrently execute the same portion of code corresponding to the kernel with each concurrent thread operating on different data). When the CPU executes code, which makes a call to copy data from the GPU memory back to the computer memory, the call may be blocked until all threads have completed processing and the output data is available. At this point, the results, such as the output data, may be transmitted from the GPU to the CPU.

An embodiment in accordance with techniques herein may use one or more GPUs in components by NVIDIA, such as GPUs in the TESLA series based on NVIDIA's massively parallel CUDA architecture, to perform processing of the lossless compression/decompression techniques described herein. As known in the art, the CUDA architecture consists of hundreds of processor cores that operate together to process application data.

An application having code executed by GPUs in accordance with the CUDA architecture may include code that performs parallel processing. An application developer may modify an application including code which performs steps sequentially to perform appropriate portions in parallel on cores of one or more GPUs with remaining portions of the application being executed by the CPU.

Mapping a function to the GPU may include rewriting the function to expose the parallelism in the function and adding code to move data to and from the GPU. In at least one embodiment in accordance with techniques herein, the developer may be tasked with launching many threads simultaneously and the GPU hardware manages the threads and does thread scheduling. Additional detail regarding how processing performed in connection with techniques herein may be partitioned between the CPU domain and the GPU domain is described elsewhere herein.

At least one embodiment in accordance with techniques herein may have the GPU cores of the GPU domain perform simultaneous data deduplication digest or hash value generation by executing the same instruction stream of hashing algorithm code in parallel where each execution instance of the instruction stream computes a different data deduplication digest or hash value for a different original data portion. For example, consider an embodiment using a GPU device that has 256 cores and can therefrom process as many as 256 different sets of input data. In this case, processing may be performed to simultaneously calculate 256 data deduplication hash values for 256 different original data portions (e.g., simultaneously calculate 256 digest or hash values for 256 corresponding input data portions). As noted above, an embodiment in accordance with techniques herein may also partition other processing tasks for execution in the GPU domain rather than the CPU domain.

An embodiment may implement the techniques herein using code executed by a processor. For example, an embodiment may implement the techniques herein using code that is executed by one or more CPUs and one or more GPUs of the data storage system, or more generally any other system. As will be appreciated by those skilled in the art, the code may be stored on the data storage system on a non-transitory computer-readable medium having any one of a variety of different forms including volatile and non-volatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor. Moreover, steps associated with method embodiments taught herein may be performed in any order without deviating from the teachings described.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of reducing data redundancy in a data storage system comprising;
searching a cluster of nearest neighbors to determine if a data block has been stored in the data storage system prior to writing the data block, wherein the cluster has been created using a locality sensitive hashing function and determination of nearest neighbors is made by evaluating a plurality of hash values placed in a coordinate system having at least four dimensions in order to determine a distance between each neighbor.

2. The method of claim 1, further comprising:
writing the data block if no match is found, else storing mapping information for the data block if a match is found within the cluster of nearest neighbors.

3. The method of claim 1, wherein the nearest neighbor cluster is created with a machine learning module or an offload engine.

4. The method of claim 1, wherein the locality sensitive hashing function is a secure hash algorithm 1 ("SHA-1") or a Message Digest 5 ("MD5") algorithm.

5. The method of claim 1 further comprising:
compressing one or more data sets within the cluster of nearest neighbors.

6. The method of claim 1, wherein the cluster of nearest neighbors includes a plurality of master blocks.

7. A system comprising:
one or more processors; and
a memory configured to:
search a cluster of nearest neighbors to determine if a data block has been stored in a data storage system prior to writing the data block, wherein the cluster has been created using a locality sensitive hashing function and determination of nearest neighbors is made by evaluating a plurality of hash values placed in a coordinate system having at least four dimensions in order to determine a distance between each neighbor.

8. The system of claim 7 further configured to:
write the data block if no match is found, else storing mapping information for the data block if a match is found within the cluster of nearest neighbors.

9. The system of claim 7, wherein the nearest neighbor cluster is created with a machine learning module or an offload engine.

10. The system of claim 7, wherein the locality sensitive hashing function is a secure hash algorithm 1 ("SHA-1") or a Message Digest 5 ("MD5") algorithm.

11. The system of claim 7 further configured to:
compress one or more data sets within the cluster of nearest neighbors.

12. The system of claim 7, wherein the cluster of nearest neighbors includes a plurality of master blocks.

13. A non-transitory, computer readable medium comprising code stored thereon that, when executed, performs the following acts:
searching a cluster of nearest neighbors to determine if a data block has been stored in a data storage system prior to writing the data block, wherein the cluster has been created using a locality sensitive hashing function and determination of nearest neighbors is made by evaluating a plurality of hash values placed in a coordinate system having at least four dimensions in order to determine a distance between each neighbor.

14. The non-transitory, computer readable medium of claim 13, wherein the code stored thereon, when executed, additionally performs the following acts:
writing the data block if no match is found, else storing mapping information for the data block if a match is found within the cluster of nearest neighbors.

15. The non-transitory, computer readable medium of claim 13, wherein the nearest neighbor cluster is created with a machine learning module or an offload engine.

16. The non-transitory, computer readable medium of claim 13, wherein the locality sensitive hashing function is a secure hash algorithm 1 ("SHA-1") or a Message Digest 5 ("MD5") algorithm.

17. The non-transitory, computer readable medium of claim 13, wherein the cluster of nearest neighbors includes a plurality of master blocks.

18. A non-transitory, computer readable medium comprising code stored thereon that, when executed, performs the following acts:
searching a cluster of nearest neighbors to determine if a data block has been stored in a data storage system prior to writing the data block wherein the cluster has been created using a locality sensitive hashing function and determination of nearest neighbors is made by evaluating a plurality of hash values placed in a coordinate system having at least four dimensions in order to determine a distance between each neighbor; and
compressing one or more data sets within the cluster of nearest neighbors.

* * * * *